Figure 1:
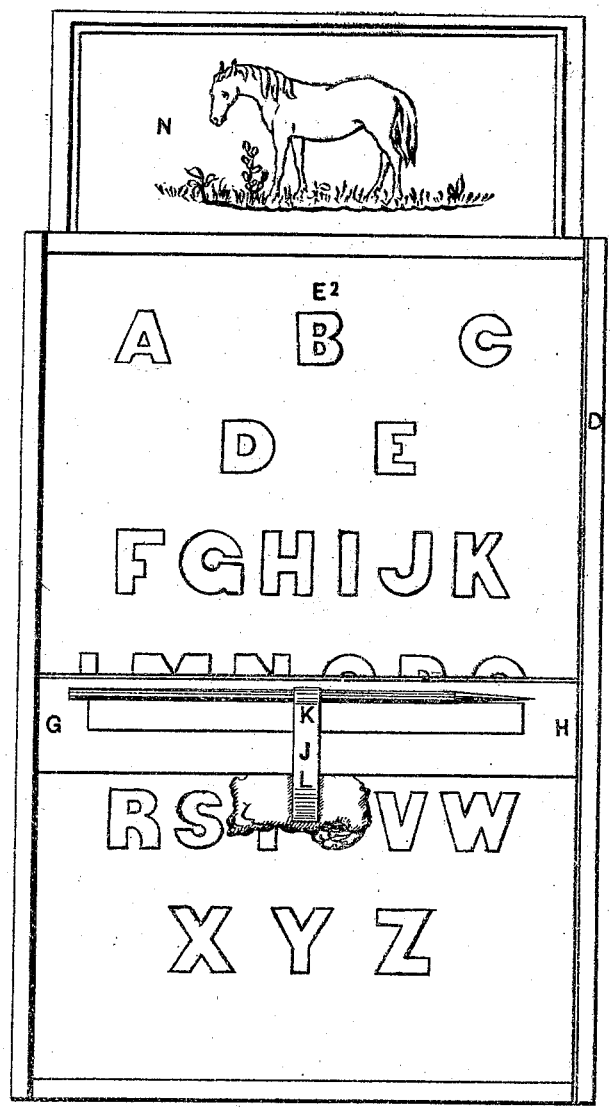

2 Sheets--Sheet 1.

WILLIAM F. BAADE.

Improvement in Reading and Drawing Cases.

No. 118,180.  Patented Aug. 22, 1871.

WITNESSES.

James Sangster
Amos W. Sangster

INVENTOR.

William F. Baade

WILLIAM F. BAADE.
Improvement in Reading and Drawing Cases.
No. 118,180. Patented Aug. 22, 1871.

2 Sheets--Sheet 2.

WITNESSES
INVENTOR

UNITED STATES PATENT OFFICE.

WILLIAM F. BAADE, OF BUFFALO, NEW YORK.

IMPROVEMENT IN READING AND DRAWING-CASES.

Specification forming part of Letters Patent No. 118,180, dated August 22, 1871.

*To all whom it may concern:*

Be it known that I, WILLIAM F. BAADE, of Buffalo, in the county of Erie and State of New York, have invented certain Improvements in Reading and Drawing-Cases, of which the following is a specification:

The first part of my invention relates to the arrangement of a reading and drawing-case for receiving a slate, rule, books, cards, or other stationery articles; and consists in the arrangement of a number of sliding screens for the purpose of exposing or concealing the letters, figures, or lessons, or any combination of the same, so that any word or sentence required, or so that various arrangements or combinations of words composing a sentence, may be presented. The second part of my invention consists in providing an opening in the end of the case, so that while the slate may be easily removed or returned, sufficient room will be left just below the slate to remove or insert the drawing-lessons, &c.

Figure 2:
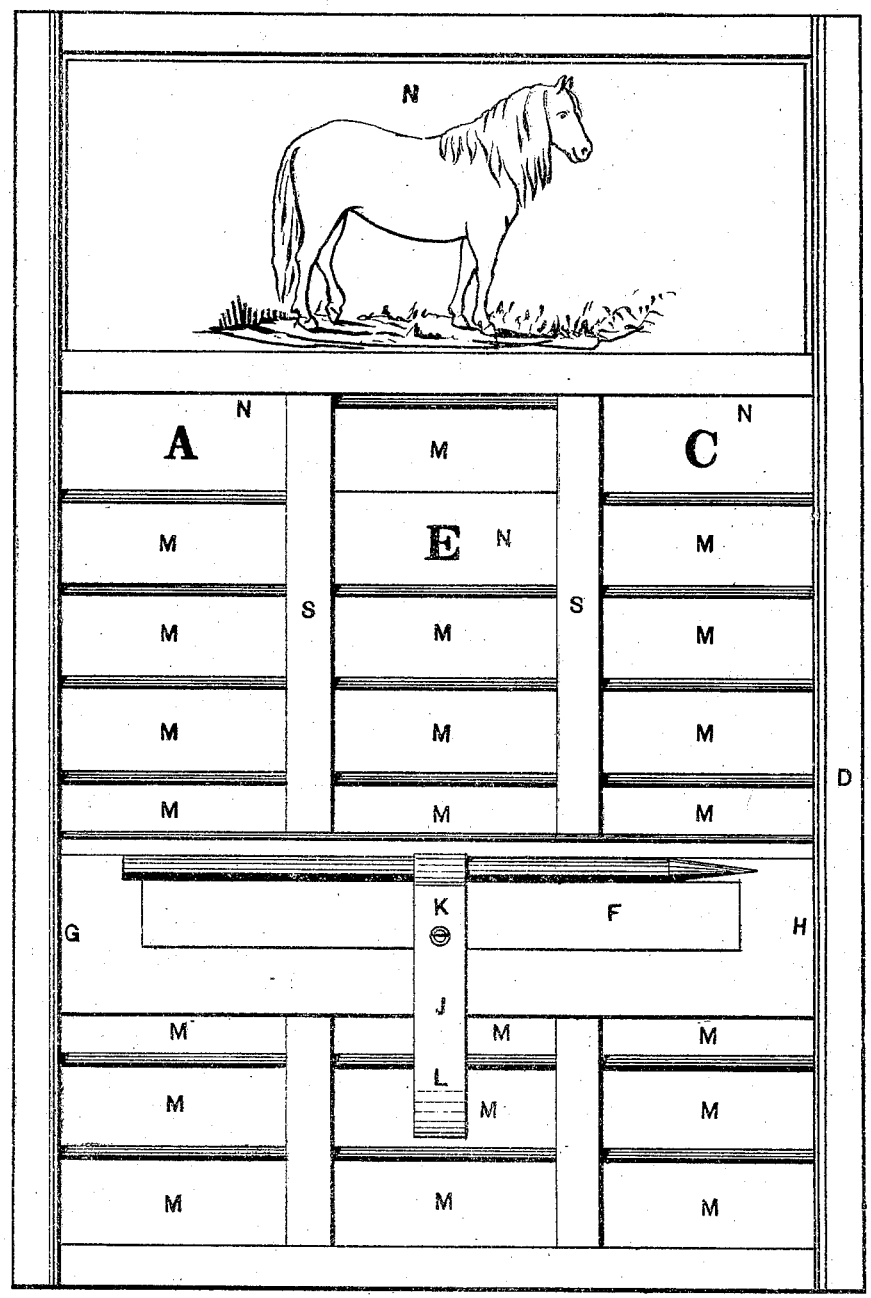
Figure 3:
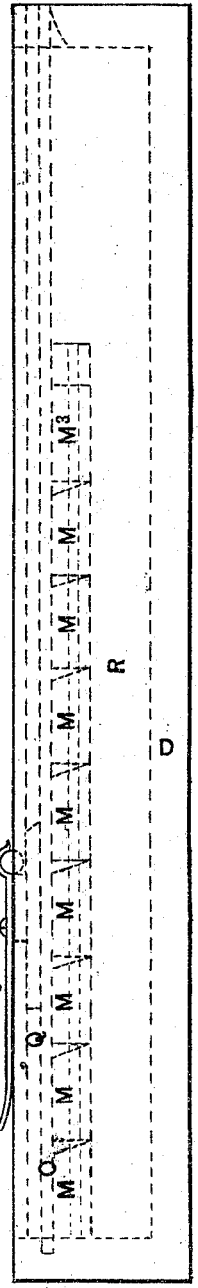
Figure 4:
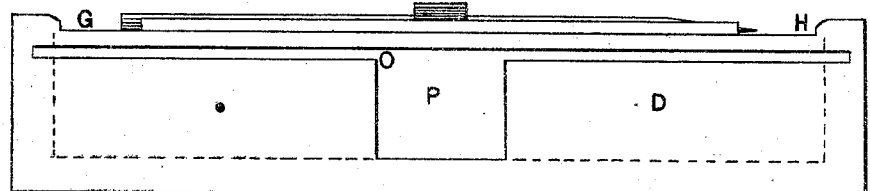

Figure 1, sheet 1, is a top view of the case, showing the slate in place, and one of the drawing-cards partly drawn out, also the rule, pencil, and sponge. Fig. 2, sheet 2, represents a top view of the interior of the case and the arrangement of the movable screens, the rule, pencil, &c. Fig. 3 is a side elevation, the dotted lines showing the arrangement of the parts within. Fig. 4 represents an end view, showing the opening for receiving the drawing-cards, slate, &c.

Like letters in the several figures represent similar parts in each.

D represents the case; $E^2$, the slate or cover, upon one side of which the letters of the alphabet are printed in outline. F is a sliding rule; it is arranged so that the ends G and H slide in grooves made in or near the top of the case, so that it may be moved over the face of the slate for the purpose of drawing parallel lines, &c. J represents a spring for holding a pencil and sponge, the pencil being held at K and the sponge at L. The position of the grooves for holding the rule is shown by the dotted lines marked Q in Fig. 3. The opening for removing the slate and card-boards is shown at O and P in Fig. 4, and its position, along the top of the case within, by the dotted lines marked O in Fig. 3. P represents that part of the opening through which the cards may be conveniently reached and handled. The movable screens are represented by the letters M. They are arranged so as to be easily moved by the fingers, and slide in grooves made lengthwise of the case, between the supports S and the sides of the case. N represents one of the drawing and reading-cards; a space is left at the top of the case for exposing the drawing. The various letters, figures, or words are presented by moving the screens; in the card shown in Fig. 2 the letters A, E, and C are exposed.

In using the drawing the card is drawn out and arranged, as shown in Fig. 1, so that a copy may be made upon the slate.

The drawing represents the full size of one of the smaller cases, several larger sizes being used.

I claim as my invention—

1. The case D, having a slide-way, Q, for the rule, and opening and slide-way formed, as shown at O and P, for receiving the slate and cards, and so that said cards may be easily reached or withdrawn, substantially as described.

2. The sliding screens M, arranged substantially as and for the purposes described.

WILLIAM F. BAADE.

Witnesses:
  JAMES SANGSTER,
  AMOS W. SANGSTER.